March 8, 1927. 1,620,424
J. W. BARNES
VEHICLE SPRING SNUBBER
Filed Dec. 12, 1925   2 Sheets-Sheet 2
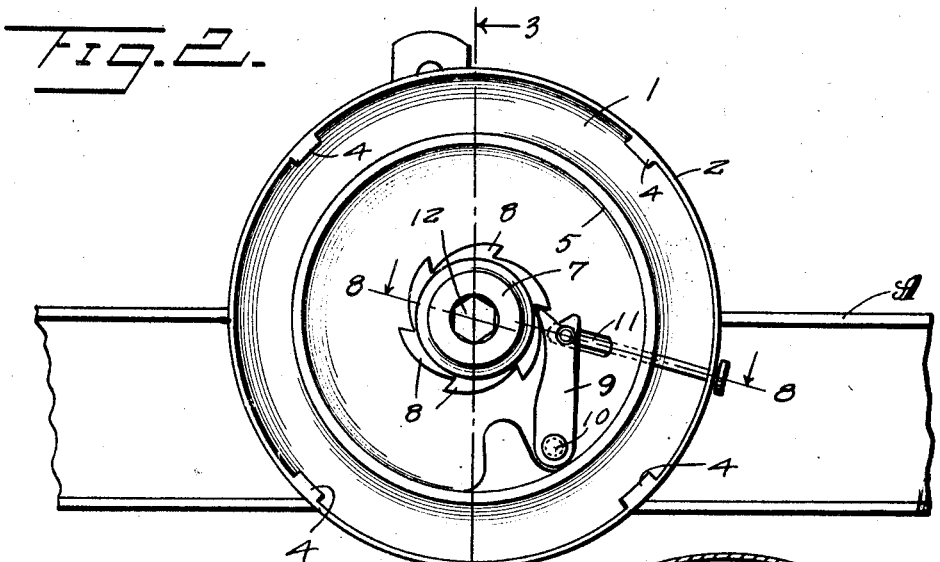
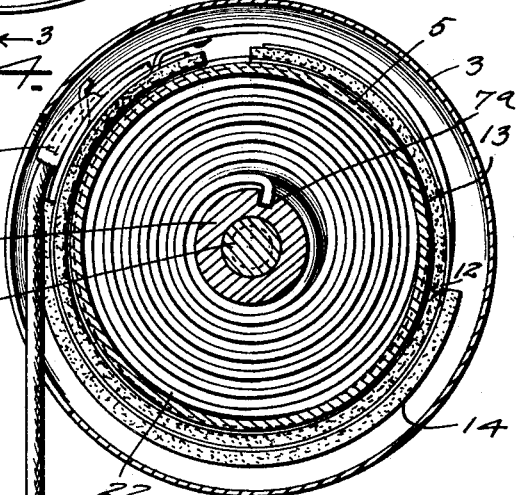
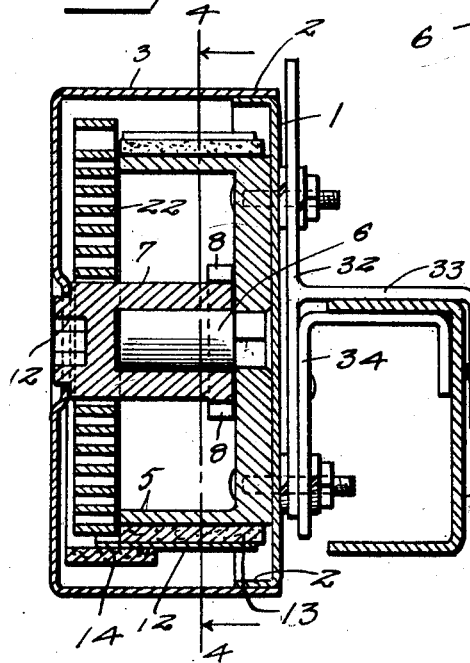
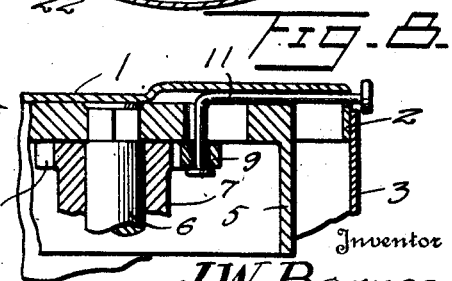
Inventor
J. W. Barnes
By
Attorney Patented Mar. 8, 1927.

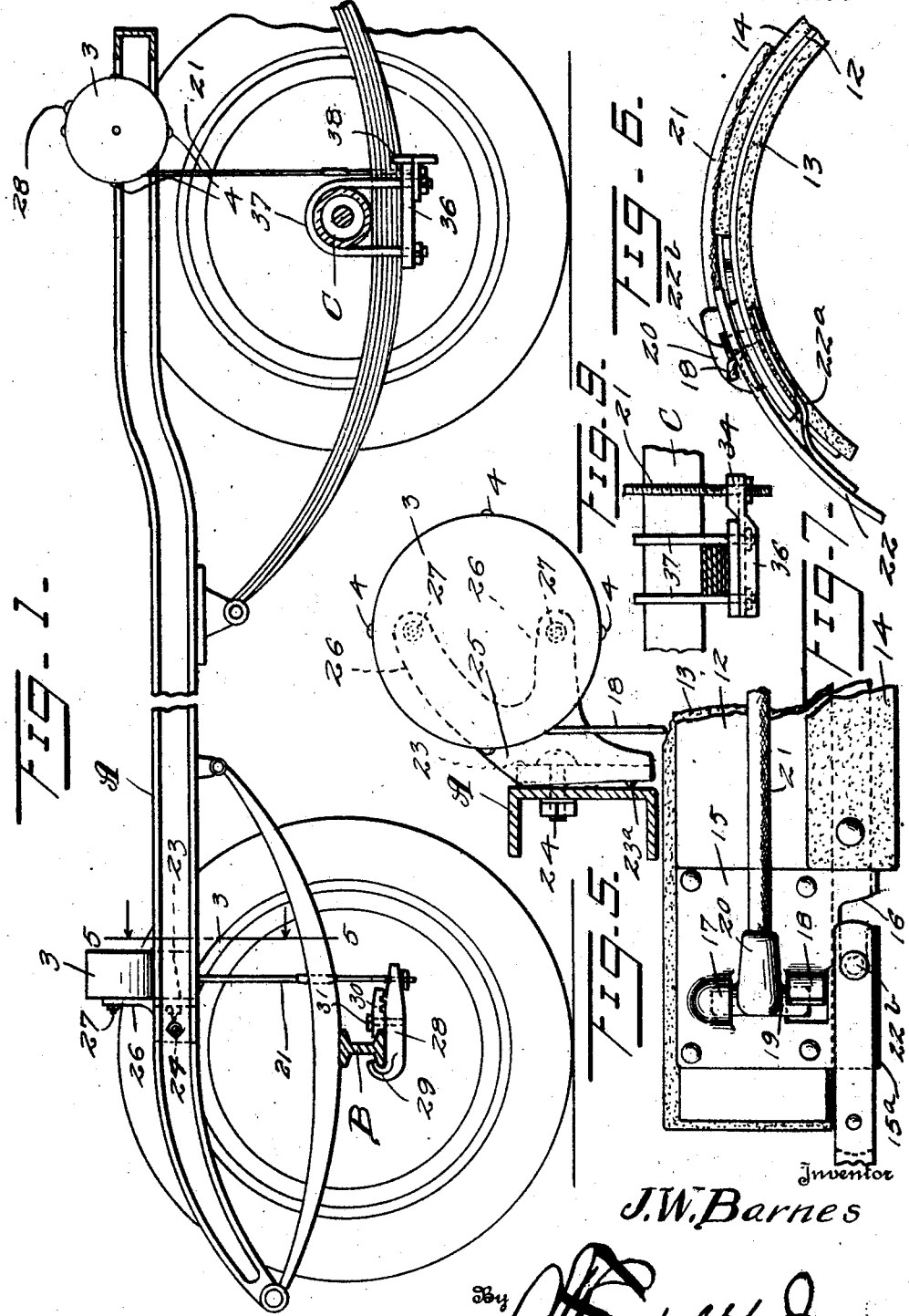

1,620,424

UNITED STATES PATENT OFFICE.

JAMES W. BARNES, OF CLEVELAND, TENNESSEE.

VEHICLE SPRING SNUBBER.

Application filed December 12, 1925. Serial No. 75,106.

The invention relates to means for checking and easing the rebound of vehicle springs to add to the ease in driving the vehicle, and also to save the springs from the shocks incident to quick rebound, and has for its object the provision of an improved construction by which a braking action is applied by means of a brake drum and a brake band mounted on the drum, the brake drum being secured to the body of the vehicle and the brake band connected to the axle by means of a flexible member, a helical spring being provided to hold the brake band in engagement with the brake drum.

A further object of the invention is the provision of means by which the tension of the helical spring heretofore referred to may be regulated to accomplish the work desired most successfully.

A further object of the invention is the provision of improved means by which the housing carrying the brake drum and band is secured to the vehicle.

The construction and operation of the invention as well as its advantages will be explained in detail hereinafter, and the construction will be found illustrated in the accompanying drawings in which—

Figure 1 is a longitudinal sectional view of the running gear of the vehicle showing the improved snubbers applied thereto, Figure 2 is a view of the face of the snubber housing and brake drum and the hub with its securing means, the brake band and the spring engaged therewith being omitted, Figure 3 is a transverse sectional view of the complete snubber showing it attached to the side beam of the vehicle taken on a plane indicated by the line 3—3 of Figure 2, Figure 4 is a sectional view on a plane indicated by the line 4—4 of Figure 3, Figure 5 is a sectional detail on a plane indicated by the line 5—5 of Figure 1, Figure 6 a fragmental side view showing the detail of the means for securing the helical spring to the brake band, Figure 7 a detail plan view of the part shown in Figure 6, Figure 8 a sectional detail on a plane indicated by the line 8—8 of Figure 2, Figure 9, a sectional detail of the means to secure the snubber rope or cable to the rear axle.

In the drawings similar reference characters are used to designate corresponding parts throughout the several views.

In Figure 1 is shown a part of an automobile frame and running gear including a side beam A, and front axle B and rear axle housing C, these parts being conventional and the other parts shown therewith being for the purpose of illustration only.

A snubber is shown in Figure 1 applied to the side beam A and connected to each of the axles. The construction of the snubber will be first described, and then the means for securing the snubber to the side beam and to the axle for front and rear of the vehicle will then be taken up in detail. The construction of the snubber for the front and rear axle is identical and comprises a housing consisting of a base 1 having a circumferential flange 2 to which is secured the cover 3 by any suitable means such for instance as screws through threaded openings in bosses 4. A brake drum 5 is secured to the base 1 and has a central stub shaft 6 on which is mounted a hub 7, the base of the hub being provided with a series of ratchet teeth 8, and 9 indicates a pawl pivotally secured as shown at 10 to the base of the brake drum 5, and by engaging the teeth 8 of the ratchet holds the hub from rotation on the shaft 6. 11 indicates a rod pivotally secured to the pawl 9 and extending outside of the housing and is adapted to be manually operated to release the pawl from engagement with the ratchet when it is desired to adjust the tension of the spring that will be hereinafter described secured to the hub. The outer end of the hub is provided with a polygonal socket 12 to be engaged by a wrench or other tool to rotate the hub to tighten the spring referred to to be hereinafter described.

A brake band 12 is mounted on the brake drum 5 and nearly encloses the brake drum as shown most clearly in Figure 4, and has a brake lining 13 secured thereto to engage the brake drum 5, and also a brake lining 14 that is secured to the outside of the brake band 12 and extends beyond the edge thereof to prevent contact of the band 12 with the housing cover 3. Secured to the brake band 12 is a plate 15 that has one of its edges projecting beyond the edge of the brake band as shown most clearly in Figure 7, at 15ª, and said projecting edge is provided with a bayonet slot 16 for the purpose hereinafter described. The plate 15 is also provided with a bearing socket 17 and a hook member 18 to receive a cross head 19 on a rope socket 20 in which is secured one end of a length of rope or cable 21, the other end of said rope or cable 21 being secured to the axle of the vehicle by means to be hereinafter described. A helical spring 22 has its inner end secured in a notch 7ª in the hub 7, while the outer end of said helical spring 22 has a tongue 22ª secured adjacent to its terminal, the end of the spring and tongue 22ª adapted to receive the projecting edge 15ª and to be secured thereto in the bayonet slot 16 by means of a pin 22ᵇ engaging the spring 22 and tongue 22ª.

The snubber for the front axle B is secured to the side beam A by means of the bracket shown in detail in Figure 5 and comprising a base 23 having its face that is seated against the beam A provided with one or more pointed teats or projections 23ª to hold it in the position to which it might be secured to said beam A by means of the bolt and nut 24. Formed integral with the base 23 is an extension 25 provided with two forked arms 26 that are adapted to be secured to the base 1 of the snubber housing by means of rivets or bolts or nuts 27. The rope or cable 21 is secured to the front axle B by means of a clamp comprising a member 28 having one end hooked as shown at 29 to engage one side of the base of the usual I-beam construction adopted for automobile front axles, and a clamping member 30 adapted to secure the other side of the base and secured to the member 28 by means of a suitable bolt 31. The end of the rope or cable 21 is secured to the free end of member 28 in any suitable manner.

The means for securing the housing to the side beam A for the rear axle C comprises a clamp consisting of a plate 32 secured to the base 1 and having an L-shaped arm 33 integral therewith and adapted to engage the outer side of the beam A which is as shown of the channel beam type, and a U-shaped arm 34 secured to base plate 32 and adapted to engage the inner walls of the channel beam A. 35 indicates a tightening screw secured in arm 33 and engaging beam A. The free end of the rope or cable 21 on the rear snubber is secured to the axle housing C by means of a clamp engaging said housing and comprising a plate 36 secured thereto by one or one or more U-shaped clips 37 and having an extension 38 to which the free end of the rope or cable is engaged in any suitable manner.

In operation it will be apparent that as the spring 22 is under tension when the vehicle axle moves relatively to the body beam A of the car, the spring 22 will tend to hold the rope or cable 21 taut at all times, the slack of the rope or cable being taken up by movement of the brake band 12 around the brake drum 5, so that when reflex action takes place caused by the vehicle spring, the tension of the spring 22 will hold the brake lining 13 in engagement with the drum 5 to retard the reflex action of the spring and thus cause the rebound, or return of the spring to its normal condition to be slowed up and thus prevent undue jar to the body of the vehicle and prevent vibration of the spring.

What is claimed is:—

A snubber comprising a housing adapted to be mounted on a vehicle frame, a brake drum secured in said housing, a segmental brake band on said drum, a flexible member secured adjacent one end of said brake band and adapted to engage a vehicle axle, a hub mounted for rotation within said brake drum, a stub shaft mounting said hub projecting from said brake drum, a helical spring connecting said hub and the brake band, the end of the spring engaging the brake band being bent back thereon and provided with a lug seating in a bayonet slot in the brake band, ratchet teeth on the hub, and a pawl pivoted in the brake drum and engaging said ratchet teeth to hold the hub from rotation in one direction.

In testimony whereof I affix my signature.

JAMES W. BARNES.